United States Patent
Xu

(10) Patent No.: US 7,633,239 B2
(45) Date of Patent: Dec. 15, 2009

(54) DIMMING CIRCUIT FOR CONTROLLING ELECTRICAL POWER

(75) Inventor: Jian Xu, Windsor (CA)

(73) Assignee: Masco Corporation, Taylor, MI (US)

( * ) Notice: Subject to any disclaimer, the term of this patent is extended or adjusted under 35 U.S.C. 154(b) by 152 days.

(21) Appl. No.: 11/684,834

(22) Filed: Mar. 12, 2007

(65) Prior Publication Data
US 2008/0224630 A1 Sep. 18, 2008

(51) Int. Cl.
*H05B 41/16* (2006.01)
(52) U.S. Cl. .................. 315/247; 315/158; 315/291; 315/224; 315/312
(58) Field of Classification Search .................. 315/247, 315/246, 209 R, 224, 225, 291, 307–311
See application file for complete search history.

(56) References Cited

U.S. PATENT DOCUMENTS

| | | | |
|---|---|---|---|
| 4,429,339 A | | 1/1984 | Jaeschke et al. |
| 5,838,116 A | * | 11/1998 | Katyl et al. .................. 315/307 |
| 6,812,916 B2 | * | 11/2004 | Hwang ....................... 345/102 |
| 2007/0210719 A1 | * | 9/2007 | Busse et al. .................. 315/158 |
| 2008/0106214 A1 | * | 5/2008 | Cheng et al. ............ 315/209 R |
| 2008/0106220 A1 | * | 5/2008 | Urakabe et al. ............. 315/308 |

FOREIGN PATENT DOCUMENTS

| | | |
|---|---|---|
| EP | 0311995 | 4/1989 |
| WO | WO 8601365 | 2/1986 |
| WO | WO 0079681 | 12/2000 |

OTHER PUBLICATIONS

International Search Report and Written Opinion of the International Searching Authority for International application No. PCT/US2008/053255 mailed Sep. 18, 2008.
International Search Report and Written Opinion dated Sep. 18, 2008.

* cited by examiner

*Primary Examiner*—Tuyet Vo
(74) *Attorney, Agent, or Firm*—Carlson, Gaskey & Olds

(57) ABSTRACT

A dimming circuit includes an isolated DC voltage source that is selectively coupled to a switch through which power is supplied from a source to a load. In a disclosed example, the switch comprises two MOSFETs. The isolated DC voltage source is selectively coupled directly to the gate and source of the MOSFETs to set them into an operative state for providing power to the load. A controller controls another switch that is operative to selectively control when the isolated DC voltage source is coupled to the switch.

8 Claims, 2 Drawing Sheets

DIMMING CIRCUIT FOR CONTROLLING ELECTRICAL POWER

TECHNICAL FIELD

This application relates to controlling electrical power to a load. More particularly, this invention relates to a dimming circuit for controlling electrical power to a load.

DESCRIPTION OF THE RELATED ART

Devices for controlling electrical power to a load such as a light are well known. The most basic is a switch that allows an individual to turn a light (or another device) on or off. Some switches include a dimming function that allows an individual to customize the amount of power that is provided to a light to achieve a desired amount of illumination. For example, some switches have a manual adjustor that allows an individual to select the brightness of a light.

Various dimmer switch configurations have been proposed. Some are useful for controlling the power that is available through a conventional wall socket. One example use of such dimmer switches is to provide light control within a room without providing a dedicated light source and switch on a separate circuit. Instead, a builder will sometimes provide a dimmable wall socket into which a lamp may be plugged as a way of providing dimmable light within a room. This is less expensive than providing a separate lighting circuit and switch.

While various arrangements of such devices are know, those skilled in the art are always striving to make improvements. One area in which improvement is desired is that there is a desire to reduce the expense and complexity of such devices. Many such devices include a reverse phase control circuit that includes two MOSFET switches in a known arrangement. Controlling MOSFETs throughout an AC cycle is difficult. It has been proposed to include an RC circuit for controlling the voltage applied to the gate and source of the MOSFET switches. The inclusion of a full wave rectifier reduces the efficiency of the overall circuitry. It would be desirable to have a more economical alternative.

SUMMARY

An exemplary dimming circuit includes an isolated DC voltage source that is selectively coupled to the gate and source of MOSFET switches that control power supply to a load.

In one example, a control module controls a switch that selectively couples the isolated DC voltage source to the gate and source of the MOSFET switches, which controls the amount of power supplied to the load through the MOSFET switches.

The various features and advantages of this invention will become apparent to those skilled in the art from the following detailed description. The drawings that accompany the detailed description can be briefly described as follows.

DETAILED DESCRIPTION

Figure 1:
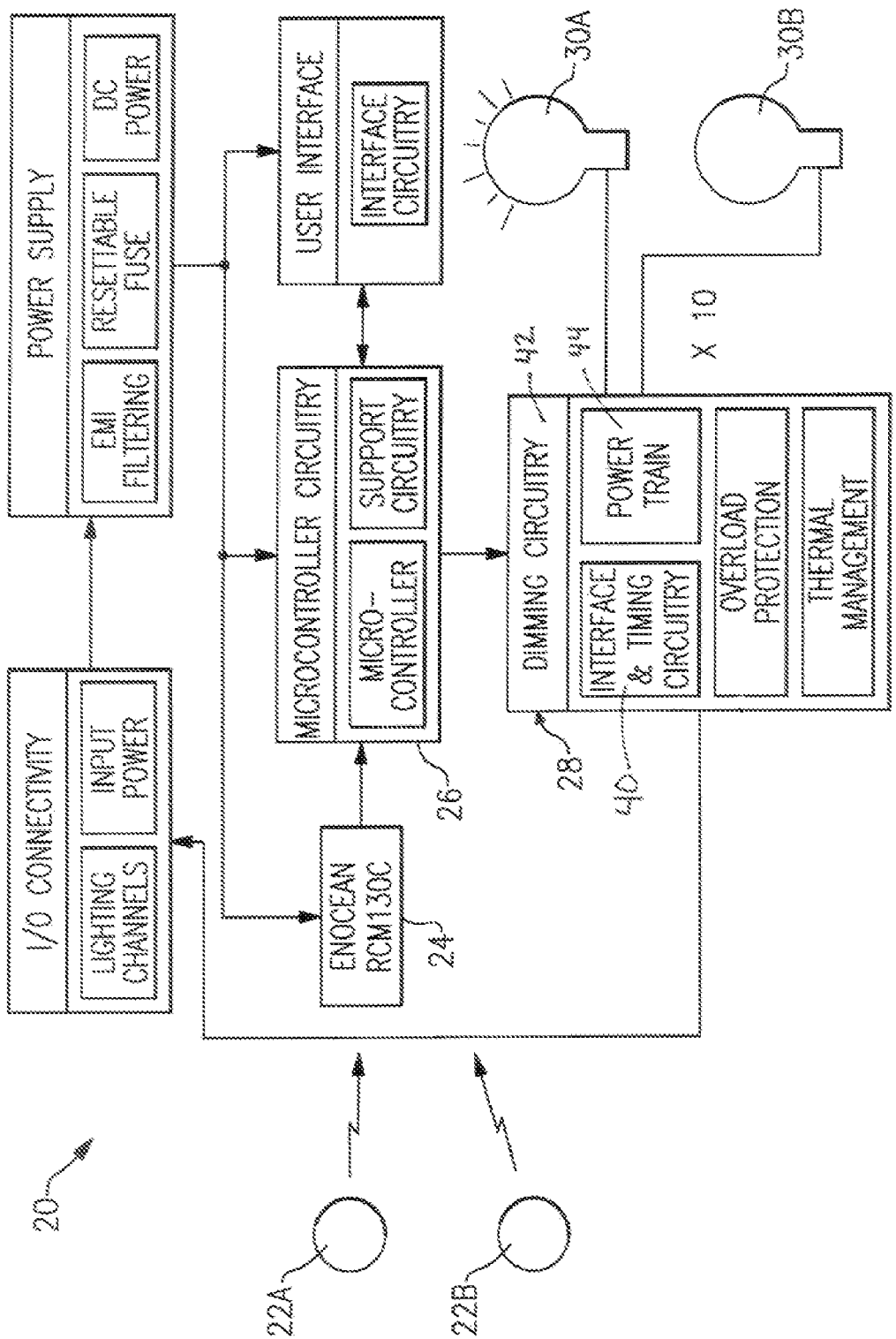
FIG. 1 is a block diagram of an overall electrical power control system.

FIG. 1 shows a lighting control circuit 20 for a building. A plurality of dimmer switches 22A, 22B communicate through a wireless connection to a multi-channel receiver 24. The receiver 24 is one example comprises a commercially available component. One example is available from Enocean under its Product No. RCM130C. The use of a wireless receiver and wireless switches are not limiting on this invention, but only mentioned as one possible type of system. The wireless connection between the switches 22 and the receiver 24 allows for the switches to be located remotely from the receiver 24. For example, the receive 24 may be supported at or near an electrical outlet in a selected room and the switches may be positioned at any convenient other location within or near the room.

The receiver 24 communicates with a microcontroller 26, which in turn communicates with dimmer circuit 28. The dimmer circuit 28 controls the intensity of several lights 30A, 30B. The illustrated dimmer circuit 28 includes timing circuitry 40, a dimmer portion 42 and a power train portion 44. The illustrated example also includes an overload protection portion and a thermal management portion.

Figure 2:
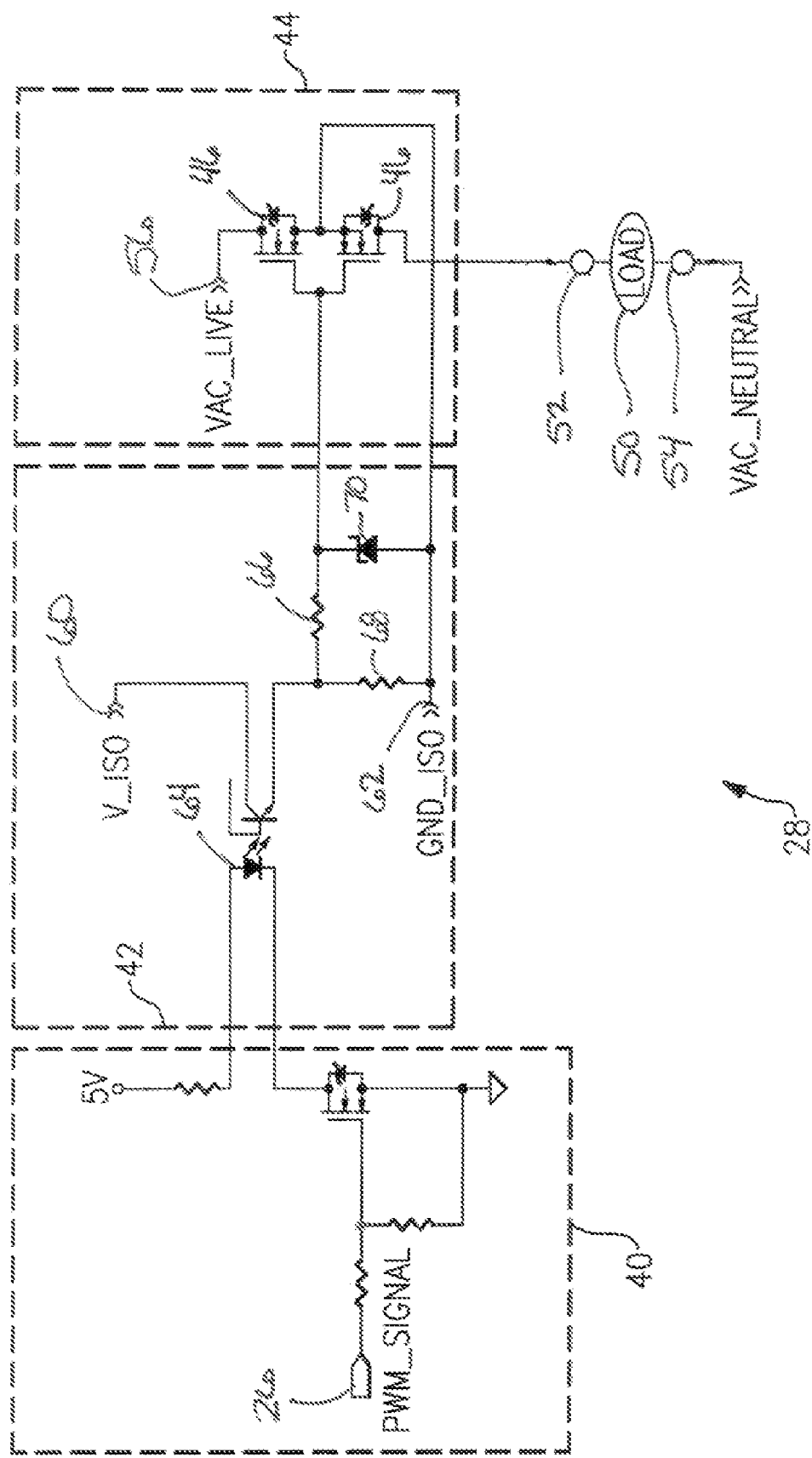
FIG. 2 is a schematic of a dimmer circuit designed according to one embodiment of this invention.

One example embodiment of the dimmer circuit 28 is illustrated in FIG. 2. The microcontroller 28 provides a timing control signal input to the timing portion 40. The timing control signal in one example comprises a pulse width modulation control signal. The timing control signal controls when the dimming portion 42 activates the MOSFET switches 46 of the power train portion 44 to control the amount of power supplied to a load 50. The microcontroller 26 determines how to set the timing control signal based upon what setting a user selects (e.g., what dimming level is desired). In one example, the microcontroller 26 uses known techniques for providing the pulse width modulation input to achieve a desired corresponding amount of dimming.

In the illustrated example, the power train portion 44 MOSFETs 46 are selected because they are efficient for certain power levels (e.g., up to about 600 W). Another example is useful with higher powers and the MOSFETs 46 are selected based upon their ability to operate under such power conditions.

One example load 50 is a light bulb. Controlling the light intensity of a bulb is one example use of the illustrated arrangement. In this example, the load 50 is plugged into a wall socket having terminals schematically represented at 52 and 54

The MOSFETs 46 in one example operate according to a known reverse phase control strategy when the gate and source of each is coupled with a sufficient voltage to set the MOSFETs 46 into an operative state (e.g., turn them on) so that they allow power from a source 56 (e.g., line AC) to be supplied to the load 50. In the reverse phase control example, the MOSFETs 46 are turned on at 0 volts and turned off at a high voltage. In another example a forward phase control strategy is used where the MOSFETs 46 turn on at a high voltage and off at 0 volts. Another example includes turning the MOSFETs 46 on at a non-zero voltage and turning them off at another non-zero voltage.

The dimming portion 42 controls when the power train portion 44 is on and, therefore, controls the amount of power provided to the load 50. Controlling the amount of power provided to a light bulb controls the intensity of light emitted by the bulb, for example.

In this example, an isolated DC voltage source 60 is selectively coupled directly to the gate and source of the MOSFETs 46 for setting them to conduct for delivering power to the load. The isolated DC voltage source 60 has an associated floating ground 62. A switch 64 responds to the timing control signal input from the microcontroller 26 and enters an operative state (e.g., turns on) to couple the isolated DC voltage source 60 to the MOSFETs 46. In the illustrated example, the switch 64 comprises an opto-coupler component. Other examples include a relay switch or a transformer component for selectively coupling the isolated DC voltage source 60 to the MOSFETs 46.

In one example, the isolated DC voltage source 60 provides 12 volts. In another example, a lower voltage is used. The voltage of the isolated DC voltage source 60 is selected to be sufficient to turn on the MOSFETs 46 to the saturation region.

One example includes using an isolated DC-DC converter to achieve the isolated DC voltage source 60. Another example includes a second-stage transformer. Those skilled in the art who have the benefit of this description will realize what components will work best for including an isolated DC voltage source in their particular embodiment.

The illustrated example includes voltage controlling components for controlling the voltage that reaches the gate and source of the MOSFETs 46. The illustrated example includes resistors 66 and 68 and a zener diode 70. The resistor 66 sets the turn on speed or the time it takes to turn on the MOSFETs 46. The resistors 66 and 68 set the turn off speed or the time it takes to turn off the MOSFETs 46. In one example, the resistor 68 has a much higher resistance compared to that of the resistor 66 such that the resistor 68 effectively sets the turn off time for the MOSFETs 46. Selecting an off speed and on speed allows for avoiding oscillation of the MOSFETs 46 and avoiding generating heat if the MOSFETs 46 were to stay in a linear operation region too long.

The zener diode 70 provides over voltage protection to shield the MOSFETs from voltage spikes and noise, for example. The zener diode 70 is configured to maintain the voltage provided to the MOSFET gate and source inputs at or below the diode's reverse breakdown voltage in a known manner. One example does not include a zener diode.

One advantage to the disclosed example is that the MOSFETs can be fully controlled during an entire AC cycle without requiring a rectifier. The disclosed example is a more efficient circuit arrangement compared to others that relied upon RC circuitry and a rectifier for controlling the MOSFETs.

The preceding description is exemplary rather than limiting in nature. Those skilled in the art may realize certain modifications to the disclosed example that do not necessarily depart from the essence of this invention. The following claims should be studied to determine the true scope and content of this invention.

I claim:

1. A dimmer circuit comprising:
    at least one switch configured to selectively allow power from a power source to be provided to a load;
    an isolated DC voltage source that is selectively coupled to the at least one switch for setting the switch to provide power from the source directly to the load; and
    a second switch between the isolated DC voltage source and the at least one switch, wherein the second switch comprises an opto-coupler and has a first operative state in which the isolated DC voltage source is coupled to the at least one switch and a second operative state where the isolated DC voltage source is disconnected from the at least one switch.

2. The dimmer circuit as set forth in claim 1, wherein the at least one switch comprises two MOSFETs and the isolated DC voltage source is selectively coupled with the gate and source of the MOSFETs.

3. The dimmer circuit as set forth in claim 1, comprising a controller that provides a timing control signal that controls the operative state of the second switch for selectively coupling the isolated DC voltage source to the at least one switch.

4. The dimmer circuit as set forth in claim 3, wherein the timing control signal comprises a pulse width modulation signal configured to achieve a desired amount of power delivery through the at least one switch to the load.

5. A dimmer circuit comprising:
    at least one switch configured to selectively allow power from a power source to be provided to a load;
    an isolated DC voltage source that is selectively coupled to the at least one switch for setting the switch to provide power from the source directly to the load; and
    at least one voltage controlling component between the isolated DC voltage source and the at least one switch for limiting a voltage applied to the at least one switch, wherein the at least one voltage controlling component comprises a zener diode.

6. The dimmer circuit as set forth in claim 5, wherein the at least one voltage controlling component comprises a first resistor that is operative to control a turn on time of the at least one switch and a second resistor that is operative to control a turn off time of the at least one switch.

7. A dimmer circuit comprising:
    at least one switch configured to be placed between a power source and a load;
    an isolated DC voltage source that is selectively coupled to the at least one switch for setting the switch to provide power from the source to the load; and
    at least one voltage controlling component between the isolated DC voltage source and the at least one switch for limiting a voltage applied to the at least one switch, wherein the at least one voltage controlling component comprises a zener diode.

8. A dimmer circuit comprising:
    at least one switch configured to be placed between a power source and a load;
    an isolated DC voltage source that is selectively coupled to the at least one switch for setting the switch to provide power from the source to the load; and
    at least one voltage controlling component between the isolated DC voltage source and the at least one switch for limiting a voltage applied to the at least one switch, wherein the at least one voltage controlling component comprises a first resistor that is operative to control a turn on time of the at least one switch and a second resistor that is operative to control a turn off time of the at least one switch.

* * * * *